(12) United States Patent
Yoshimura

(10) Patent No.: US 9,347,523 B2
(45) Date of Patent: May 24, 2016

(54) CHAIN

(75) Inventor: Daisuke Yoshimura, Mie (JP)

(73) Assignee: BorgWarner Inc., Auburn Hills, MI (US)

( * ) Notice: Subject to any disclaimer, the term of this patent is extended or adjusted under 35 U.S.C. 154(b) by 197 days.

(21) Appl. No.: 13/262,343

(22) PCT Filed: Mar. 29, 2010

(86) PCT No.: PCT/US2010/028986
§ 371 (c)(1),
(2), (4) Date: Sep. 30, 2011

(87) PCT Pub. No.: WO2010/114778
PCT Pub. Date: Oct. 7, 2010

(65) Prior Publication Data
US 2012/0035012 A1   Feb. 9, 2012

(30) Foreign Application Priority Data
Apr. 3, 2009 (JP) ................................. 2009-090612

(51) Int. Cl.
*F16G 13/04* (2006.01)
*F16G 13/08* (2006.01)

(52) U.S. Cl.
CPC ................ *F16G 13/04* (2013.01); *F16G 13/08* (2013.01)

(58) Field of Classification Search
USPC ................................................ 474/212, 213
See application file for complete search history.

(56) References Cited

U.S. PATENT DOCUMENTS

| | | | | |
|---|---|---|---|---|
| 6,406,394 | B1 * | 6/2002 | Bubel et al. | 474/212 |
| 7,048,665 | B2 * | 5/2006 | Ledvina et al. | 474/212 |
| 7,329,198 | B2 * | 2/2008 | Kotani | 474/212 |
| 2002/0006843 | A1 * | 1/2002 | Reber | 474/213 |
| 2002/0128102 | A1 * | 9/2002 | Bubel et al. | 474/212 |
| 2003/0236145 | A1 * | 12/2003 | Ledvina et al. | 474/215 |
| 2005/0070389 | A1 * | 3/2005 | Morishige | 474/213 |
| 2008/0020882 | A1 * | 1/2008 | Tohara et al. | 474/212 |
| 2010/0016110 | A1 * | 1/2010 | Yoshida | 474/213 |

FOREIGN PATENT DOCUMENTS

| | | | |
|---|---|---|---|
| JP | 2000320619 A | | 11/2000 |
| JP | 2004353865 A | | 12/2004 |
| JP | 2008151316 A | | 7/2008 |
| WO | WO 2008/075791 | * | 6/2008 |

* cited by examiner

*Primary Examiner* — William E Dondero
*Assistant Examiner* — Mark K Buse
(74) *Attorney, Agent, or Firm* — BrooksGroup

(57) ABSTRACT

To provide a chain which makes it possible to reduce friction loss during operation. [Means of Resolution] An endless silent chain 1 which comprises a plurality of links 2 having respective pairs of pin holes 22, which are linked in such a way as to be able to flex about one another by means of linking pins 3 that are inserted into the pin holes 22, wherein one or more projections 25, 26 is/are provided on one of the main surfaces 2A of the links 2 so that a specific gap C is formed between adjacent links 2 in the width direction of the chain, and these projections 25, 26 come into contact with the main surface 2B of the link 2 which is adjacent to that link 2 in the width direction of the chain.

13 Claims, 6 Drawing Sheets

CHAIN

TECHNICAL FIELD

The present invention relates to a chain such as a power transmission chain or a timing chain, and more specifically it relates to an improved structure for reducing friction loss during operation.

PRIOR ART

A silent chain, for example, is used as a timing chain in motor vehicles and motorcycles etc. The silent chain generally has a configuration in which a large number of links comprising respective pairs of tooth parts and pin holes are respectively linked in a pivotable manner by linking pins which are inserted into each pin hole.

When a silent chain is operating, the adjacent links slide against each other, producing friction loss. Such friction loss reduces the operating efficiency of the chain, while also leading to increases in oil temperature due to the heat which is generated, and therefore it is preferable to reduce friction loss during operation as far as possible.

Furthermore, there has recently been a strong demand in the automotive field for improved fuel consumption for environmental reasons, and therefore there need to be improvements in order to reduce friction loss during the travel of silent chains too.

Moreover, Japanese Unexamined Patent Application Publication 2000-320619 and Japanese Unexamined Patent Application Publication 2004-353865 disclose silent chains wherein protrusions are provided on guide links which are disposed outside outermost links, and these protrusions come into contact with the outermost links; those documents also disclose silent chains wherein protrusions are provided outside the outermost links, and these protrusions come into contact with the guide links; however, in these cases, the space between the outermost links and the guide links is enlarged, which increases the contact region between the outermost links and the rockers. Furthermore, in these cases, the outermost links and the guide links make contact by way of the protrusions and the main surfaces, but the adjacent inner links in the width direction of the chain make contact by way of the main surfaces, and there is a large amount of sliding resistance.

Furthermore, Japanese Unexamined Patent Application Publication 2008-151316 discloses that protrusions are provided on the outer surface of the guide plates or link plates which are disposed on the outermost side of a silent chain, and these protrusions come into sliding contact with a guide part on the chain guide or tensioner arm, and in this case, the sliding resistance when the chain slides over the guide part on the chain guide or tensioner arm is reduced, thereby reducing friction loss. However, the adjacent links in the width direction of the chain come into contact on their main surfaces in this case, producing greater sliding resistance.

SUMMARY OF THE INVENTION

Issues to be Resolved by the Invention

The present invention has been devised in view of the conventional situation outlined above, and the issue addressed by the present invention lies in providing a chain which makes it possible to reduce friction loss during operation by reducing the sliding resistance between adjacent links.

Means of Resolving the Issues

The chain according to the invention of claim 1 is an endless chain which comprises a plurality of links having respective pairs of pin holes, which are linked in such a way as to be able to flex about one another by means of linking pins that are inserted into the pin holes, wherein one or more projections is/are provided on part of the main surfaces of the links so that a specific gap is formed between adjacent links in the width direction of the chain, and the projections come into contact with the main surface of the link which is adjacent thereto in the width direction of the chain. It should be noted that in this specification, "main surface" indicates the surface of the links which overlaps another link; the main surfaces are parallel to the length direction of the chain, and they are not the side surfaces, back surfaces, or end surfaces which are the surfaces in the thickness direction of the links.

According to the invention of claim 1, the projections which are provided on the main surfaces of the links come into contact with the main surface of the link which is adjacent thereto in the width direction of the chain, and by means of this, a specific gap is formed between the adjacent links in the width direction of the chain. Consequently, when the links flex during operation of the chain, the projections of one link slide over the main surface of another link, rather than the main surfaces of two links between adjacent links sliding against each other. This makes it possible to reduce the sliding resistance during operation of the chain, and friction loss can be reduced. Furthermore, a specific gap is formed between adjacent links, which means that lubricating oil can be supplied into this gap, thereby making it possible to further reduce friction loss, and also to reduce the amount of heat generated.

In the invention of claim 2, which is in accordance with claim 1, the projections lie orthogonal to the pin hole center line in the length direction of the links which passes through the center of the pin holes in the link, and are disposed on the pin hole center line in the height direction of the links which passes through the center of the pin holes.

In the invention of claim 3, which is in accordance with claim 1, the projections are disposed on the pin hole center line in the length direction of the links which passes through the center of the pin holes in the link.

In the invention of claim 4, which is in accordance with claim 1, the chain is a silent chain.

In the invention of claim 5, which is in accordance with claim 1, the chain is a roller chain or a bush chain.

In the case of a roller chain or bush chain, the inside links which are disposed on the inner side in the width direction of the chain and the outside links which are disposed on the outer side in the width direction of the chain are generally linked by pins so as to be able to flex about one another, and during operation the main surfaces of the inside links and the outside links slide against one another.

Accordingly, in this case too, the projections which are provided on the main surface of one of the links (the inside links, for example) come into contact with the main surfaces of the other links (the outside links, for example), whereby a specific gap is formed between adjacent inside links and outside links in the width direction of the chain. Consequently, when the links flex during chain operation, it is not the main surfaces of the inside links and outside links which slide together, rather the projections on one of the links (the inside links, for example) slide over the main surfaces of the other links (the outside links, for example). This makes it possible to reduce the sliding resistance when the chain is operating, and to reduce friction loss. Furthermore, a specific gap is formed between adjacent links, which means that lubricating oil can be supplied into this gap, thereby making it possible to further reduce friction loss, and also to reduce the amount of heat generated.

Effects of the Invention

As described above, with the chain according to the present invention, one or more projections is/are provided on part of the main surfaces of the links, these projections coming into contact with the main surface of the link which is adjacent thereto, and therefore a specific gap is formed between the adjacent links in the width direction of the chain, which means that when the links flex during operation of the chain, the projections of one link slide over the main surface of another link, rather than the main surfaces of two adjacent links sliding against each other. This makes it possible to reduce the sliding resistance during operation of the chain, and friction loss can be reduced.

MODE OF EMBODIMENT OF THE INVENTION

Exemplary embodiments of the present invention will be described below in conjunction with the appended figures.

First Exemplary Embodiment

FIGS. 1 to 4 illustrate a silent chain according to the first exemplary embodiment of the present invention; in these figures, the same reference symbols are used to denote similar or corresponding elements.

Figure 1:
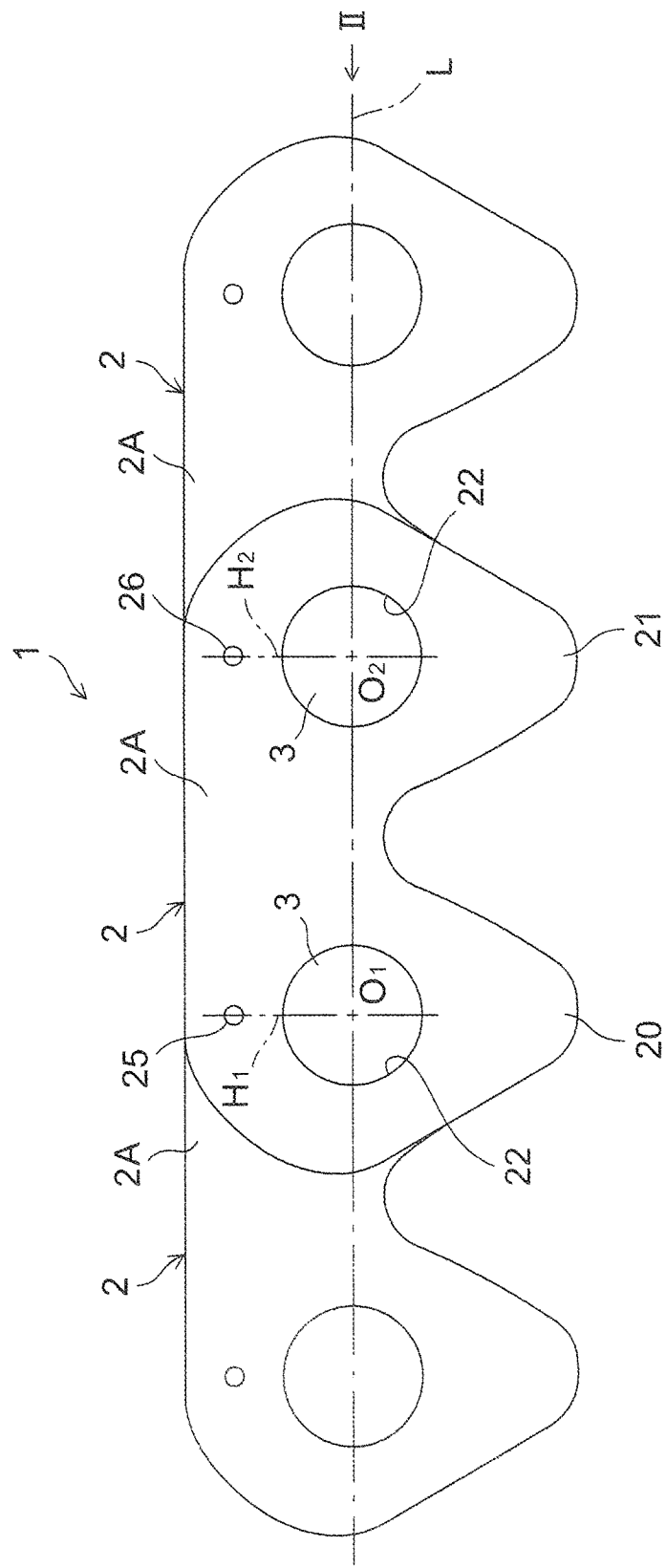
FIG. 1 is a partial front view of a silent chain according to a first exemplary embodiment of the present invention.
Figure 2:
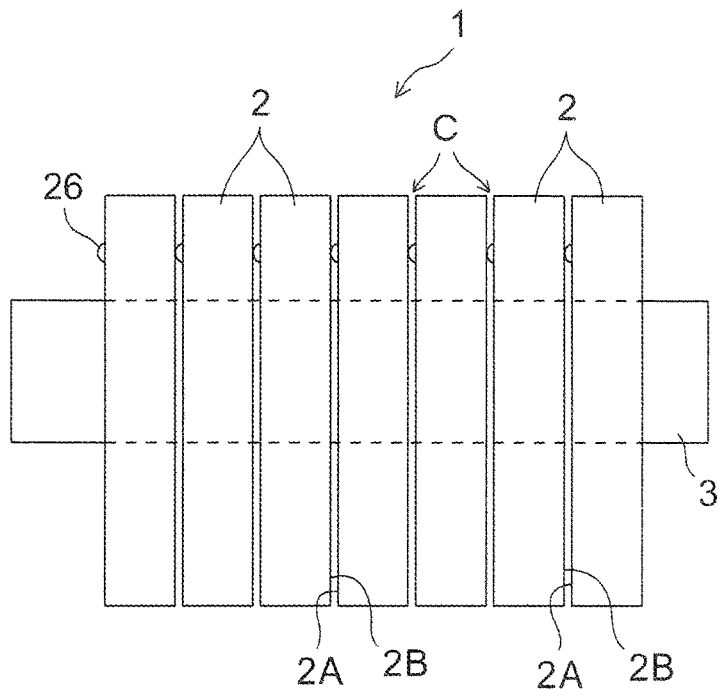
FIG. 2 is a view seen along the arrow II in FIG. 1.
Figure 3:
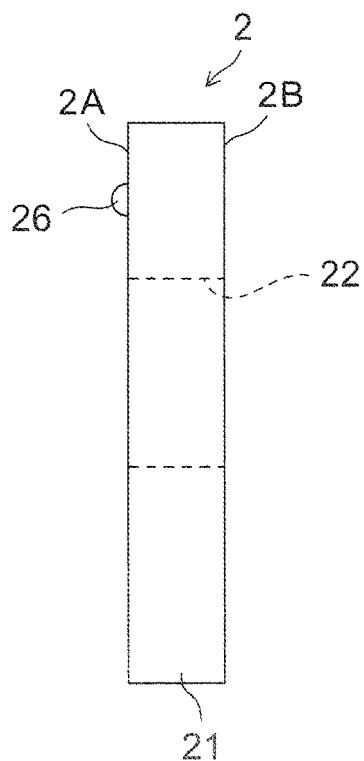
FIG. 3 is a side view of a link corresponding to an enlarged partial view of FIG. 2.

As shown in FIG. 1, a silent chain 1 comprises a plurality of links 2 which are overlapping in the length direction (the left-right direction in this figure) and the width direction (the direction perpendicular to the surface of the page in this figure) of the chain (see FIG. 2). Each link 2 comprises a pair of tooth parts 20, 21, and a pair of pin holes 22, and the links are linked in such a way as to be able to flex about one another by means of linking pins 3 which are inserted into the pin holes 22.

A pair of projections 25, 26 is formed on one of the main surfaces 2A of the links 2. Each projection 25, 26 lies orthogonal to a pin hole center line L in the length direction of the links which passes through the centers $O_1$, $O_2$ of the pin holes in the link 2, and is disposed on opposite sides of the tooth parts 20, 21 on the pin hole center lines $H_1$, $H_2$ in the height direction of the links which pass through the centers $O_1$, $O_2$ of each pin hole. It should be noted that in FIG. 1, the chain is disposed in a straight line, and the pin hole center line L of the adjacent links 2 in the length direction of the chain extends in a straight line in the length direction of the chain.

The projections 25, 26 of the link 2 come into contact with the other main surface 2B of the link 2 which is adjacent to that link 2 in the width direction of the chain, and by means of this a specific gap C is formed between the adjacent links 2 in the width direction of the chain (see FIG. 2).

Figure 4:
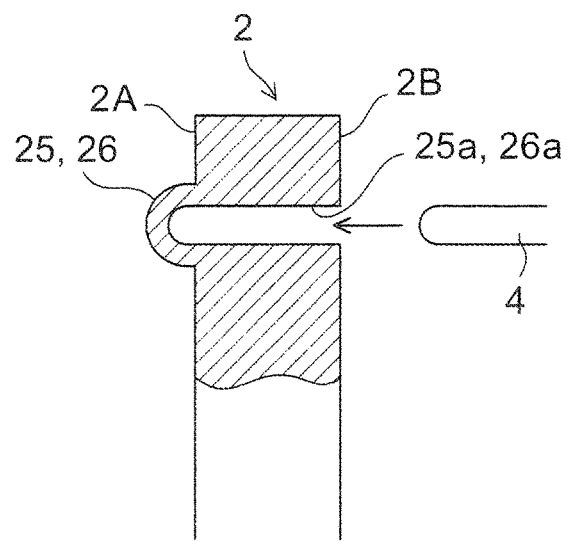
FIG. 4 shows an example of the processing method used to produce the projections which are formed on the links.

The projections 25, 26 protrude in a hemispherical shape, for example (see FIG. 3), and FIG. 4 shows an example of the method for forming same. As shown in that figure, the projections 25, 26 are formed by pressing from the side of the main surface 2B of the link 2 using a punch 4 which has a circular cross section. In this process, blind holes 25a, 26a which are produced by the pressing are formed for each of the projections 25, 26 in the link 2. It should be noted that the shape of the projections 25, 26 is not limited to a hemispherical shape, and a truncated circular cone shape which becomes steadily smaller in diameter toward the tip end is also feasible.

With the silent chain 1 which is configured in the manner described above, the projections 25, 26 which are provided on one of the main surfaces 2A of the link 2 come into contact with the other main surface 2B of the link 2 which is adjacent to that link 2 in the width direction of the chain not only when the chain is disposed in a straight line (see FIG. 1), but also when the chain 1 is wound onto sprockets (not depicted) and the links 2 flex about one another, and by means of this the specific gap C is always formed between the links 2 which are adjacent in the width direction of the chain (see FIG. 2).

This means that when the links 2 flex during operation of the chain 1, the projections 25, 26 which are formed on the main surface 2A of one link 2 slide over the main surface 2B of another link 2, rather than the main surfaces 2A, 2B of two links 2 between adjacent links 2 sliding against each other. This makes it possible to reduce the sliding resistance during operation of the chain, and friction loss can be reduced. Furthermore, the specific gap C is formed between adjacent links 2, which means that lubricating oil can be supplied into this gap C, thereby making it possible to further reduce friction loss, and also to reduce the amount of heat generated.

Figure 5:
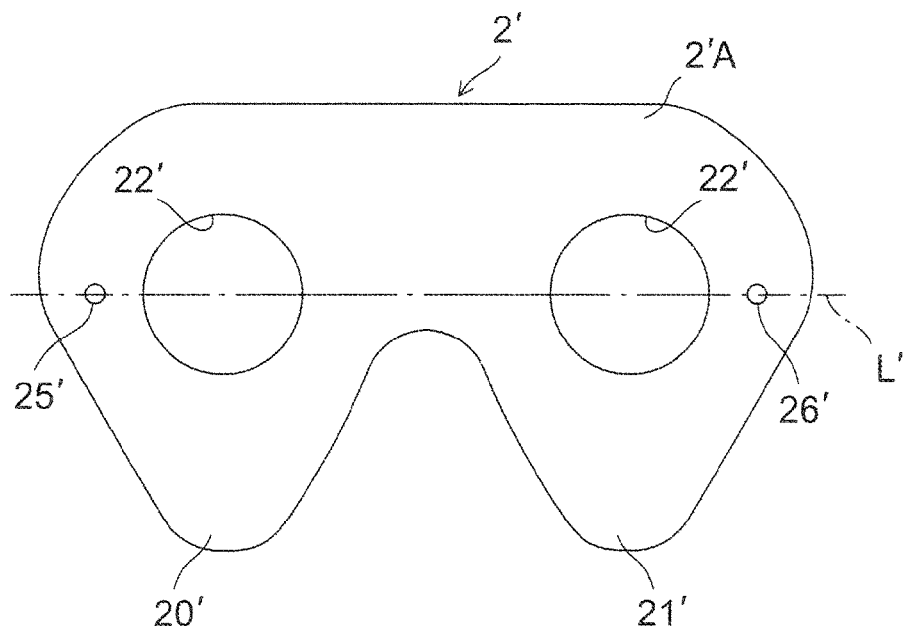
FIG. 5 is a front view showing a first variant example of the links.
Figure 6:
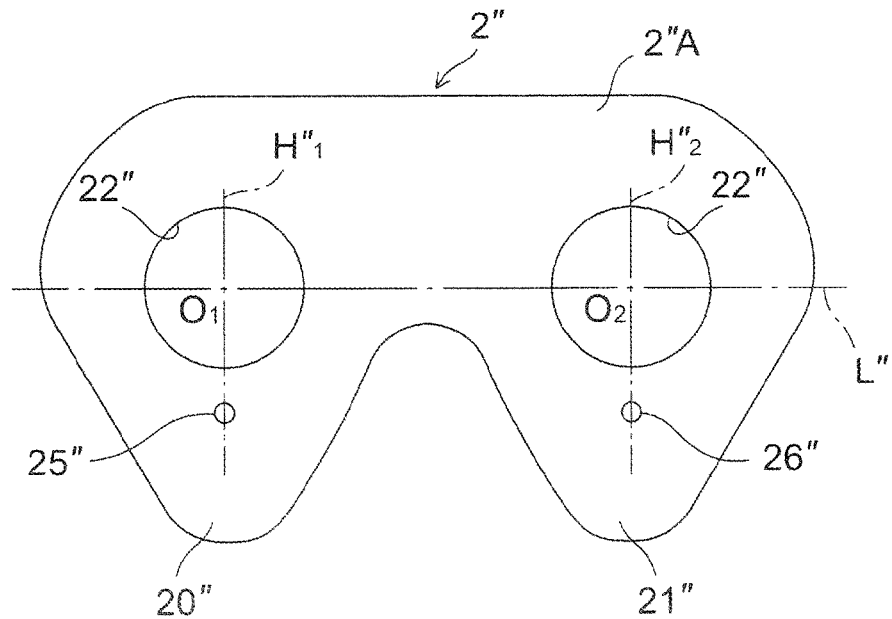
FIG. 6 is a front view showing a second variant example of the links.

FIGS. 5 and 6 show links 2', 2" which are in accordance with first and second variant examples of the present invention. It should be noted that in these figures, reference symbols which are the same as those in FIG. 1 denote similar or corresponding elements.

In the first variant example, as shown in FIG. 5, projections 25', 26' are disposed in positions at the ends of the link 2', on a pin hole center line L' in the length direction of the link which passes through the center of pin holes 22' in the link 2'.

In the second variant example, as shown in FIG. 6, projections 25", 26" lie orthogonal to a pin hole center line L" in the length direction of the link which passes through the centers $O_1$, $O_2$ of the pin holes 22" in the link 2", and are disposed on the side of tooth parts 20", 21" on pin hole center lines $H_1$", $H_2$" in the height direction of the links which pass through the pin hole centers $O_1$, $O_2$.

In both of these cases, in the same way as in the first exemplary embodiment described above, the projections 25', 26', 25", 26" which are provided on one of the main surfaces 2'A, 2"A of the links 2', 2" come into contact with the other main surface of the links 2', 2" which is adjacent to those links 2', 2" in the width direction of the chain not only when the chain is disposed in a straight line (see FIG. 1), but also when the chain 1 is wound onto sprockets (not depicted) and the links 2', 2" flex about one another, and by means of this the specific gap C is always formed between the links 2' or the links 2" which are adjacent in the width direction of the chain (see FIG. 2).

This means that when the links 2', 2" flex during operation of the chain, the projections 25', 26', 25", 26" which are formed on the main surfaces 2'A, 2"A of one link 2 slide over the main surfaces of another link 2', 2", rather than the opposing main surfaces of two links 2', 2" between adjacent links 2', 2" sliding against each other. This makes it possible to reduce the sliding resistance during operation of the chain, and friction loss can be reduced. Furthermore, the specific gap C is formed between adjacent links 2' or 2", which means that lubricating oil can be supplied into this gap C, thereby making it possible to further reduce friction loss, and also to reduce the amount of heat generated.

It should be noted that the projections may equally be provided in positions other than those shown in FIGS. 5 and 6, provided that they are in a region where the adjacent links in the width direction of the chain are overlapping. Furthermore, there need not be two projections provided on each of the links, and one or three or more links are feasible. In addition, the shape of the links is not limited to a localized protrusion. This shape may be a circular protruding boss which is formed at the edge of the opening of the pin holes 3, for example.

Second Exemplary Embodiment

Figure 7:
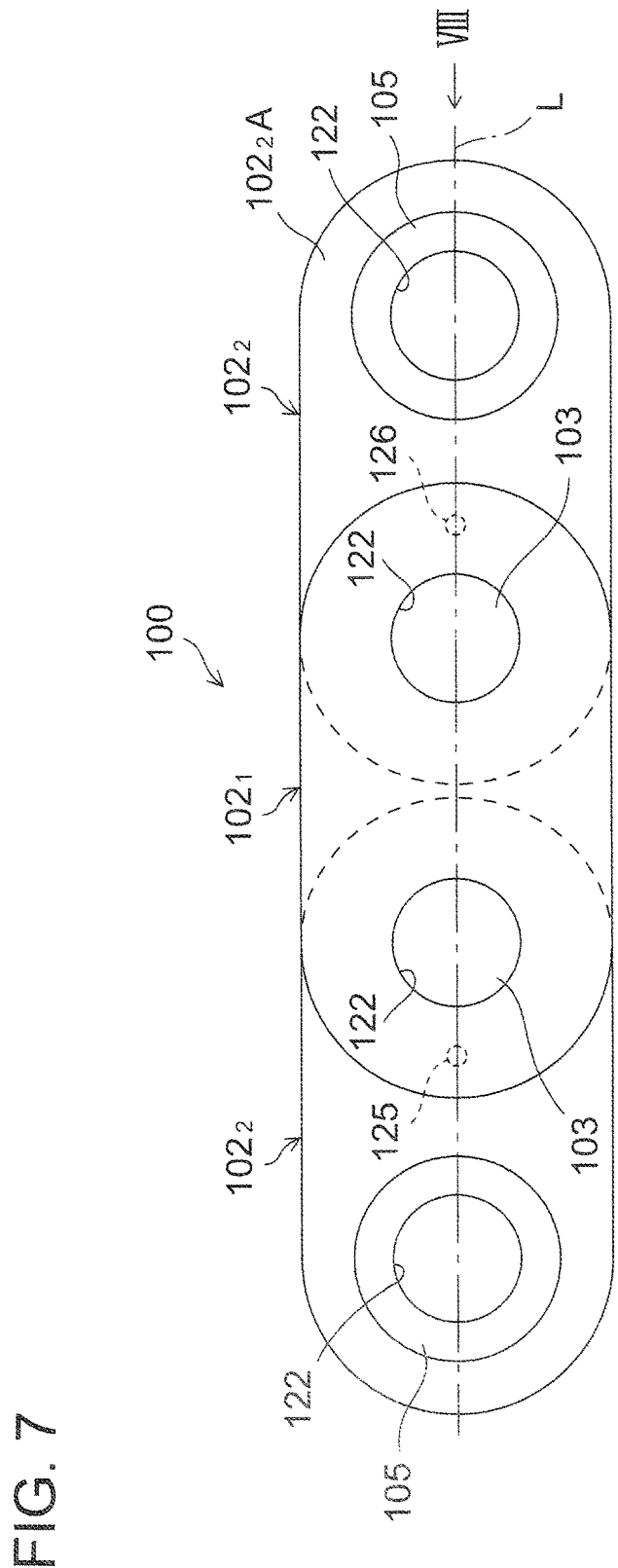
FIG. 7 is a partial front view of a bush chain according to a second exemplary embodiment of the present invention.
Figure 8:
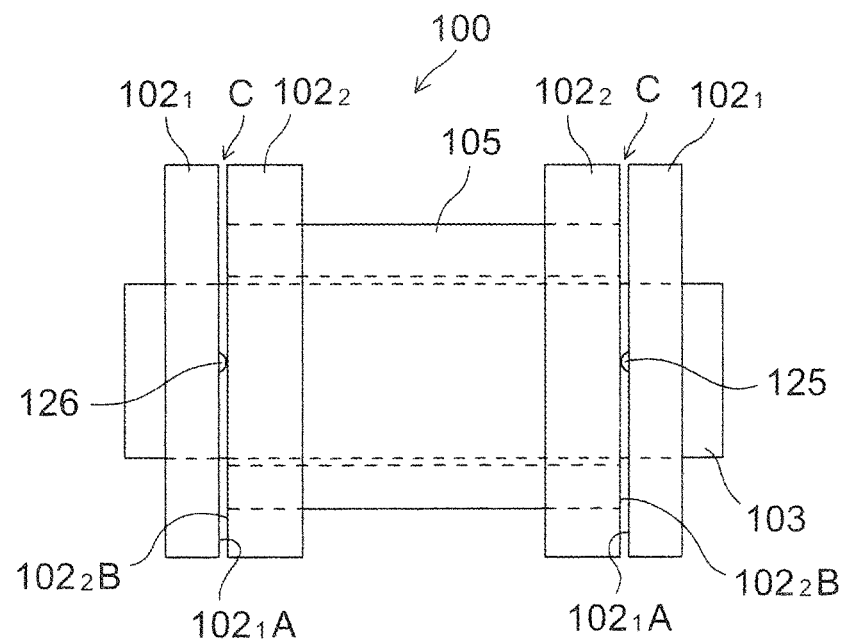
FIG. 8 is a view seen along the arrow VIII in FIG. 7.
Figure 9:
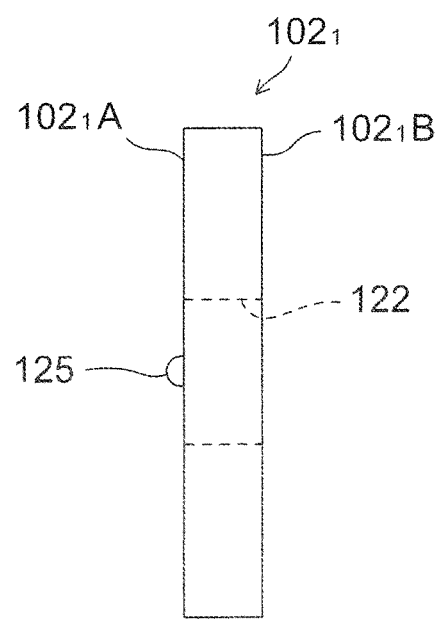
FIG. 9 is a side view of a link corresponding to an enlarged partial view of FIG. 8.

FIGS. 7 to 9 illustrate a bush chain in accordance with the second exemplary embodiment of the present invention, and in these figures, reference symbols which are the same denote similar or corresponding elements.

As shown in FIGS. 7 and 8, a bush chain 100 has a pair of outer links $102_1$ which are disposed on both outer sides in the width direction of the chain (the direction perpendicular to the surface of the page in FIG. 7), and a pair of inner links $102_2$ which are disposed inside the outer links $102_1$ while overlapping part of each outer link $102_1$, these links being disposed in the length direction (the left-right direction in FIG. 7) of the chain. Each of the outer links $102_1$ and inner links $102_2$ has a pair of pin holes 122, and the links are linked in such a way as to be able to flex about one another by means of linking pins 103 which are inserted into the pin holes 122. The ends of bushes 105 which are able to rotate around the linking pins 103 are fixedly attached to the inner links $102_2$. The pin holes 122 of the inner links $102_2$ consist of through-holes in the bushes 105. It should be noted that in the example shown here, the inner links $102_2$ are thicker than the outer links $102_1$.

The pair of projections 125, 126 is formed on one of the main surfaces $102_1$A of the outer links $102_1$. Each projection 125, 126 is disposed outside the pin holes 122 on the pin hole center line L in the length direction of the links which passes through the center of each pin hole in the outer links $102_1$. It should be noted that in FIG. 7, the chain is disposed in a straight line, and the pin hole center line L in the adjacent outer links $102_1$ and inner links $102^2$ in the length direction of the chain extends in a straight line in the length direction of the chain. Furthermore, the main surfaces $102_1$A of the pair of outer links $102_1$ which are disposed in an opposing fashion in the width direction of the chain face each other in the width direction of the chain (see FIG. 8).

The projections 125, 126 of the outer links $102_1$ come into contact with the main surfaces $102_2$B of the inner links $102_2$ which are adjacent to the outer links $102_1$ in the width direction of the chain, and because of this, the specific gap C is formed between the adjacent outer links $102_1$ and inner links $102_2$ in the width direction of the chain (see FIG. 8).

The projections 125, 126 consist of hemispherical protrusions, for example (see FIG. 9); the shape of the projections 125, 126 is not limited to a hemispherical shape, and a truncated circular cone shape which becomes steadily smaller in diameter toward the tip end is also feasible.

With the silent chain 100 which is configured in the manner described above, the projections 125, 126 which are provided on one of the main surfaces $102_1$A of the outer link $102_1$ come into contact with the main surface $102_2$B of the inner link $102_2$ which is adjacent to the outer link $102_1$ in the width direction of the chain not only when the chain 100 is disposed in a straight line (see FIG. 7), but also when the chain 100 is wound onto sprockets (not depicted) and the outer links $102_1$ and inner links $102_2$ flex about one another, and by means of this the specific gap C is always formed between the outer links $102_1$ and inner links $102_2$ which are adjacent in the width direction of the chain (see FIG. 8).

This means that when the outer links $102_1$ and inner links $102_2$ flex during operation of the chain 100, the projections 125, 126 which are formed on the main surface $102_1$A of the outer links $102_1$ slide over the main surface $102_2$B of the inner links $102_2$, rather than the main surfaces of two links $102_1$, $102_2$ between adjacent outer links $102_1$ and inner links $102_2$ sliding against each other. This makes it possible to reduce the sliding resistance during operation of the chain, and friction loss can be reduced. Furthermore, the specific gap C is formed between adjacent outer links $102_1$ and inner links $102_2$, which means that lubricating oil can be supplied into this gap C, thereby making it possible to further reduce friction loss, and also to reduce the amount of heat generated.

It should be noted that the projections may equally be provided in positions other than those shown in FIG. 7, provided that they are in a region where the adjacent outer links and inner links in the width direction of the chain are overlapping. Furthermore, there need not be two projections formed on the outer links, and one or three or more links are feasible. In addition, the links which are provided with the projections are not limited to the outer links, and the inner links may be provided with said projections. Furthermore, the shape of the links is not limited to a localized protrusion; this shape may be a circular protruding boss which is formed at the edge of the opening of the pin holes 103, for example. The present invention may equally be applied to a roller chain.

FIELD OF INDUSTRIAL APPLICATION

The present invention is suitable for chains such as power transmission chains or timing chains, and it is especially suitable for chains in which there is a requirement for reducing friction loss during operation.

KEY TO SYMBOLS

1: silent chain
2: link
2A, 2B: main surface
22: pin hole
25, 26: projection
3: linking pin
100: bush chain
$102_1$: outer link
$102_1$A: main surface
$102_2$: inner link
$102_2$B: main surface
103: linking pin 122: pin hole
125, 126: projection
$O_1$, $O_2$: pin hole center
L: pin hole center line in length direction of link
$H_1$, $H_2$: pin hole center line in height direction of link
C: gap

PRIOR ART DOCUMENTS

Patent Documents

[Patent Document 1] Japanese Unexamined Patent Application Publication 2000-320619 (see FIGS. 5 to 7)
[Patent Document 2] Japanese Unexamined Patent Application Publication 2004-353865 (see FIGS. 5 to 6E)
[Patent Document 3] Japanese Unexamined Patent Application Publication 2008-151316 (see FIGS. 4, 6, 9, 10)

The invention claimed is:

1. An endless chain which comprises a plurality of inner and outer links having respective pairs of pin holes, which are linked in such a way as to be able to flex about one another by means of linking pins that are inserted into the pin holes, wherein one or more projections is/are provided on part of the main surfaces of the inner and outer links so that a specific gap is formed between adjacent links in the width direction of the chain, and the projections come into contact with the main surface of the link which is adjacent thereto in the width direction of the chain.

2. The chain as claimed in claim 1, wherein the projections lie orthogonal to a pin hole center line in the length direction of the links which passes through the center of the pin holes in the link, and are disposed on the pin hole center line in the height direction of the links which passes through the center of the pin holes.

3. The chain as claimed in claim 1, wherein the projections are disposed on a pin hole center line in the length direction of the links which passes through the center of the pin holes in the link.

4. The chain as claimed in claim 1, wherein the chain is a silent chain.

5. The chain as claimed in claim 1, wherein the chain is a roller chain or a bush chain.

6. An endless chain comprising a first link having a first projection on a main surface of the first link, and an adjacent second link having a second projection on a main surface of the second link, wherein the first projection engages the main surface of the second link so that a gap is formed between the first link and the adjacent second link and wherein the first link is an outer guide link and the second link is an inner link of the chain.

7. An endless chain as set forth in claim 6 wherein the first link and the second link are each an inner link of the chain.

8. An endless chain as set forth in claim 6 wherein the first link is an inner link and the second link is an outer guide link of the chain.

9. An endless chain as set forth in claim 6 further comprising a third link adjacent the second link and wherein the second projection engages the main surface of the third link so that a gap is formed between the second link and the adjacent third link.

10. An endless chain comprising a plurality of links including a first outer guide link and an opposite second outer link, and at least one inner link interposed between the first outer guide link and the opposite second outer link, inner link comprises a projection on a main surface thereof and constructed and arranged to engage a main surface of at least one of the first outer guide link or the opposite second outer link, and wherein the inner link comprises a projection constructed and arranged to engage a main surface of at least one of the first outer guide link or the opposite second outer link so that a gap is formed between the inner link and at least one of the first outer guide link or the opposite second outer link, and wherein at least one of the first outer guide link or the opposite second outer link comprises a projection on a main surface thereof.

11. An endless chain comprising a plurality of links including a first outer guide link and an opposite second outer link, and a plurality of inner links interposed between the first outer guide link and the opposite second outer link, wherein each of the outer guide links comprise a projection on a main surface thereof and wherein each of the plurality of inner links comprises a projection on a main surface thereof and constructed and arranged to engage a main surface of an adjacent link comprising one of the plurality of inner links or one of the first outer guide link or the opposite second outer link so that a gap is formed between each of adjacent links across the entire width of the chain.

12. An endless chain comprising a plurality of inside links and outside links wherein each of the inside and outside links comprise a projection on a main surface thereof and constructed and arranged to engage a main surface of an adjacent inside link or an adjacent outside link so that a gap is formed between each of adjacent links in the width direction of the chain and a gap is formed for every set of adjacent links across the entire width of the chain.

13. An endless chain comprising a plurality of inside links and outside links wherein at least one of the plurality of the inside links comprises a projection on a main surface thereof and wherein at least one of the plurality of outside links comprises a projection on a main surface thereof, and wherein the projections are constructed and arranged to engage a main surface of an adjacent inside link or an adjacent outside link so that a gap is formed between each of adjacent links in the width direction of the chain and a gap is formed for every set of adjacent links across the entire width of the chain.

* * * * *